United States Patent [19]

Henderson et al.

[11] 4,124,272
[45] Nov. 7, 1978

[54] ROTARY FIBER OPTIC WAVEGUIDE COUPLING

[75] Inventors: James A. Henderson, Finksburg; Pamela D. Oliver, Laurel, both of Md.

[73] Assignee: Westinghouse Electric Corp., Pittsburgh, Pa.

[21] Appl. No.: 868,790

[22] Filed: Jan. 12, 1978

Related U.S. Application Data

[63] Continuation of Ser. No. 750,473, Dec. 14, 1976, abandoned.

[51] Int. Cl.$^2$ .................................................. G02B 5/14
[52] U.S. Cl. ................................ 350/96.21; 350/96.20
[58] Field of Search ................ 350/96.21, 96.20, 96.22

[56] References Cited

U.S. PATENT DOCUMENTS

| | | | |
|---|---|---|---|
| 3,800,388 | 4/1974 | Börner et al. | 350/96.21 |
| 3,922,063 | 11/1975 | Marrone | 350/96.15 |
| 4,027,945 | 6/1977 | Iverson | 350/96.20 |

*Primary Examiner*—John K. Corbin
*Assistant Examiner*—Stewart Levy
*Attorney, Agent, or Firm*—D. F. Straitiff

[57] ABSTRACT

A rotary fiber optic waveguide coupling. Bared ends of two fiber optic waveguide cable sections are held in mutually-aligned end-to-end adjacent positions in opposite extension along a common rotary axis by a pair of ferrules having central through-openings in which such ends coextend and are bonded in close fit. The ferrules are held in precise axial position by abutment at their inner ends with annular shoulder in a pair of alignment caps mounted in two members movable relatively about such rotary axis. Retaining sleeves screwed into the relatively turnable members cooperate with washer members on the ferrules to obtain such abutment, and the ferrules project through openings in the alignment caps to obtain precise radial positioning. A friction-free rotary bearing interconnects the two relatively turnable members. The bearing is preloaded along the axis of rotation to give precise axial and radial positions of the one turnable member relative to the other.

8 Claims, 3 Drawing Figures

ROTARY FIBER OPTIC WAVEGUIDE COUPLING

This is a continuation of application Ser. No. 750,473 filed Dec. 14, 1976, now abandoned.

BACKGROUND OF THE INVENTION

1. Field of the Invention
Fiber optic waveguides.
2. Description of the Prior Art Heretofore, insofar as applicants are aware, where fiber optic waveguide transmission of data signals had to transpire between two relatively turnable or rotatable members, it has been the practice to convert the signals from optical to electrical at input to a rotary brush-and-slip-ring interconnector and back to optical at output from such interconnector. This practice tends to detract from the inherent advantages of use of optical waveguides, such as isolation from electromagnetic interference etc., and introduces the elements of wear and maintenance of contact integrity with respect to performance of such electromechanical type interconnector.

A preliminary novelty search was made in the U.S. Patent and Trademark Office with respect to the optical waveguide rotary interconnector of the present invention, that uncovered the following U.S. Pat. Nos.: 2,290,278 to Failla; 3,012,463 to Krivit; 3,051,035 to Root; 3,118,422 to McNamara; 3,217,589 to Chitayat; 3,389,950 to Harper; 3,504,984 to Bush; 3,734,594 to Trambarulo; 3,880,148 Kanehira et al; and 3,914,880 to Dakas et al. None of these patents disclose, teach, or suggest a fiber optic waveguide rotary coupling suitable for use in data signal transmission with minimal signal loss. Those of the above patents that relate to rotary optical coupling do so only with respect to image and illumination coupling and fail to recognize any need for low-loss data signal coupling via a rotary joint.

SUMMARY OF THE INVENTION

The rotary fiber optic waveguide coupling of the present invention for the first time offers opportunity for coupling high frequency data signals optically through a rotary interconnect with signal loss of less than four db. By use of applicants' arrangement of ferrules, alignment caps, and preloaded rotary bearing, construction of the subject coupling can be arrived at within the realm of the usual machined surface tolerances.

DETAILED DESCRIPTION OF THE INVENTION

Figure 1:
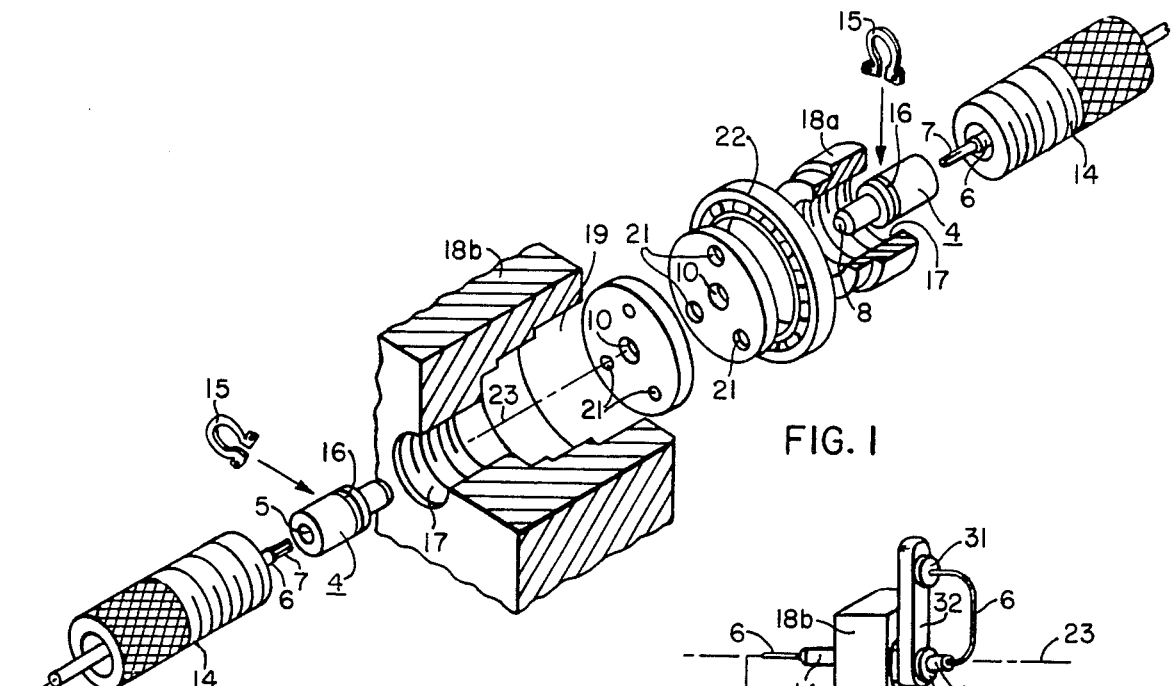
FIG. 1 is an isometric three-dimensional exploded view of an illustrative embodiment of the invention.
Figure 2:
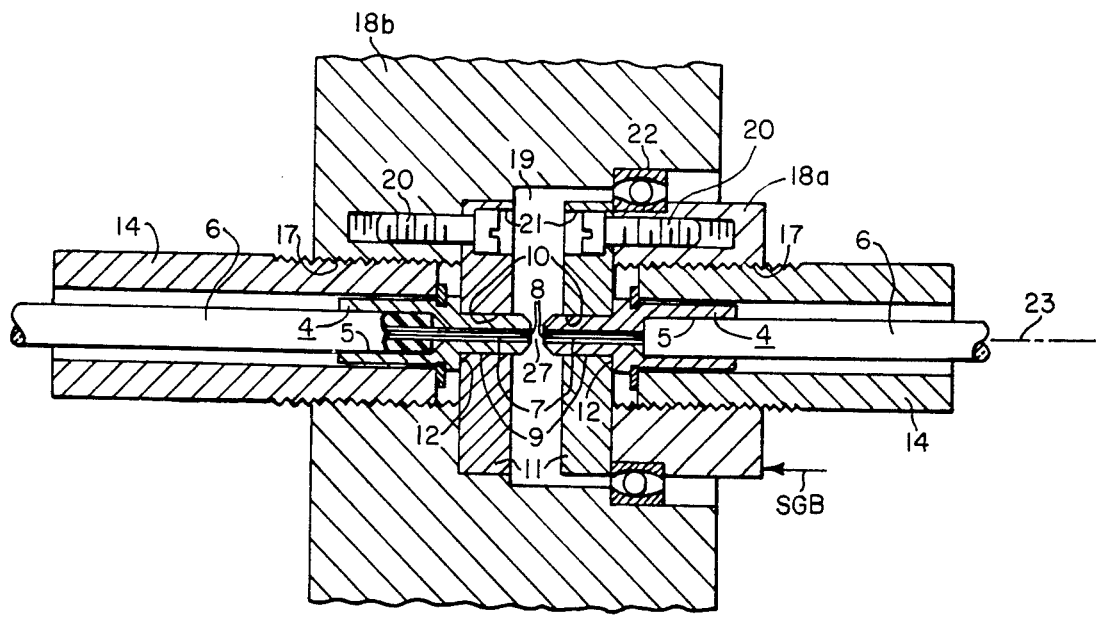
FIG. 2 is a cross sectional view of the embodiment of FIG. 1, in its assembled state.

Referring to FIGS. 1 and 2, the rotary fiber optic waveguide coupling of the present invention comprises a pair of ferrules 4 of elongated generally cylindrical configuration and made of a rigid material, such as metal or hard plastic. Each ferrule has a fiber optic cable accepting end with an interior axial opening 5 slightly greater than the outer diameter of the protecting jacket 6 encircling a fiber optic waveguide, which may be single strand or a bundle of strands, and a bared fiber optic waveguide-accomodating end of reduced diameter with a central through-opening 8 of slightly greater diameter than that of bared ends of fiber optic waveguides 7 which initially are inserted and bonded therein in a manner to obtain extension to the furthermost end of such cable-accommodating opening.

The outer cylindrical surfaces of the reduced-diameter ends of the ferrules, with the waveguide ends bonded in place, are accurately located by close fits with the inner surfaces of through-openings 10 in a pair of disc-shaped alignment caps 11 disposed adjacent to one another and in coaxial alignment.

The reduced-diameter ends of the ferrules project through the alignment cap openings 10 from opposite directions, one with respect to the other, in a manner that obtains close positioning of the ends of the fiber optic waveguides. The precise end-to-end spacing of the ferrule ends is obtained by abutting contact of annular shoulders 12 formed in the ferrules with radially-extending faces of the alignment caps 11 in the immediate vicinity of the openings 10 through which the reduced-diameter ends of the ferrules extend.

Such axialwise-locating abutting contact of the ferrule shoulders with the radial cap surfaces is obtained by retaining sleeves 14 that encircle the larger diameter portions of the ferrules and exert an axial thrust force thereon via split ring members 15 assembled into grooves 16 in the ferrules. The retaining sleeves 14 have a loose fit around the end of ferrules to avoid interference with the radial locating function of the alignment openings 10 in the alignment caps 11.

The retaining sleeves perform their function by way of screw-threaded attachment within accommodating openings in two relatively rotatable housing or coupling members 18a and 18b, one of which, 18a, extends into a cavity 19 formed in the other. One cap member 11 is removably secured to the one rotary member 18b at the inner terminus of the cavity 19 by machine screws 20, only one of which is shown. The other cap is similarly secured to the other of the two relatively rotatable members 18a for disposition within the cavity 19 adjacent to the first cap member. Circumferentially-spaced-apart counterbores 21 extend axially through the caps for accommodating such machine screw securement.

Anti-frictin bearing means 22 mounted in member 18b and fit around member 18a is so arranged as to provide for turning movement of the one member relative to the other about an axis 23 passing through the centers of the aligned through-openings in the alignment caps 11 as secured in place in such members.

To assure precise positioning of the ferrule-and-cap assemblies, hence of the fiber optic waveguide ends, the inner and outer races of the bearing 22 are biased in an axialwise direction relative to one another by suitable means not shown. The bearing is so affiliated with the two relatively rotatable members 18a and 18b, and the preload bias in such that the effective slack gathering occurs in a direction tending to bring the adjacent projecting ferrule ends together, as indicated by the arrow SGB shown in FIG. 2 ac*'ng on member 18a.

In operation of the coupling, because of the broad bandwidth handling capability of the fiber optic waveguide 7, signals otherwise requiring many electrical lines may be multiplexed and carried over such waveguide. It is highly desirable, however, that the optical data signal transmission across the gap 27 between the relatively-rotatable ends of the fiber optic waveguides 7 encounter minimal loss in behalf of avoiding system performance degradation. A loss of less than four db should be expected, including packing fraction losses for bundles. To achieve this, the coupling of the present invention is constructed and arranged to maintain axial or lateral alignment of better than 20% of the diameter of the ends of the waveguides 7, called "optical aperture" together with an angular alignment of such ends of better than 50% of the arc sin (numerical aperture), and a reasonable limit of end separation. The end separation of the waveguide ends, gap 27 width, has been found to be not as critical as the other criteria, with suitable transmission between ends separated by as much as one fourth of an inch often feasible. The larger the numerical aperture, the more critical the end separation. It will be appreciated, also, that the end faces of the waveguides 7 facing each other across the gap 27 be protected from contamination, which degrades the performance of the system. It will also be apparent that the closer the bearing 22 is located with respect to the optical interface between the waveguide ends, the less tendency there exists for radial and angular misalignment.

In one demonstration unit an optical aperture of 11 millimeters (0.044 in.) was used, with less than two thousandths of an inch radial misalignment between ferrule ends obtained, together with less than one degree of angular misalignment and an end separation of about one hundredth of an inch. The unit demonstrated a coupling loss of less than three and one half db, including packing fraction losses.

Figure 3:
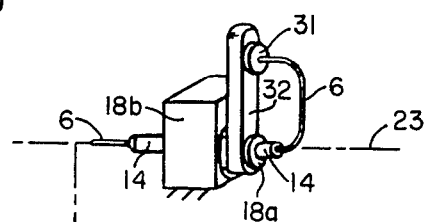
FIG. 3 is a schematic showing of a data signal transmission system embodying the optical waveguide coupling of the present invention.

As shown schematically in FIG. 3, the coupling of the present invention will find application in system involving transmission of optical data signals from a source 30, which may be stationary or relatively immobile, for example, to an optical data signal utilizing device 31 which may be relatively rotatable about the axis 23 by virtue of affiliation with the relatively turnable coupling member 18a via such as an attached support member 32. Other arrangements also will be employed.

What is claimed is:

1. A rotary coupling for fiber optic waveguide comprising,
   a pair of relatively rotatable members,
   bearing means establishing precise axial, radial and angular rotary interconnection between said relatively rotatable members,
   a pair of locating members having axial, radial, and angular locating surfaces thereon and attachable to the ends of fiber optic waveguides to define precise positions thereof relative to such surfaces,
   alignment means defining axial, radial and angular locating surfaces on said relatively rotatable members complementary to the locating surfaces on said locating members, and
   retaining means for retaining said locating members on said relatively rotatable members, respectively, in complementary locating surface cooperation.

2. The rotary coupling of claim 1, wherein said alignment means consists of separately formed cap members attached to such relatively rotatable members.

3. The rotary coupling of claim 1, wherein said retaining means includes a pair of retaining sleeves encircling said locating members with radial clearance and in screw-threaded securement to said relatively rotatable members, respectively, and
   a pair of split ring members assembled in outer grooves in said locating members and in abutment by ends of said retaining sleeves.

4. The rotary coupling of claim 1, wherein said bearing means is biased in behalf of gathering any radial, axial, and angular slack therein.

5. A rotary fiber optic waveguide coupling comprising,
   a pair of ferrules for holding the ends of two fiber optic waveguides in mutually-aligned end-to-end adjacent positions, said ferrules having central through-openings for accepting such waveguide ends with close fit,
   a pair of parallel-arranged alignment caps having aligned openings through which said ferrules project in close radial fit in oppositely-extending end-adjacent positions,
   a pair of retaining sleeves in axialwise thrust transmitting relationship with said ferrules for establishing axialwise-position-defining contact with stop surfaces on said alignment caps,
   two relatively rotatable coupling members in removable supporting attachment with said alignment caps and with said retaining sleeves, and
   anti-friction bearing means supporting one of said coupling members for rotary movement relative to the other.

6. The rotary fiber optic waveguide coupling of claim 5, further comprising,
   washer elements on said ferrules on which the ends of said retaining sleeves act as mediums via which the aforesaid axialwise thrust transmitting relationship is established.

7. The rotary fiber optic waveguide coupling of claim 5, wherein said ferrules are in screw-threaded attachment with said rotatable coupling members, respectively.

8. The rotary fiber optic waveguide coupling of claim 5, wherein
   said anti-friction bearing means is biased in behalf of gathering any radial or axial slack therein.

* * * * *